(12) United States Patent
Tomaz et al.

(10) Patent No.: US 11,822,795 B2
(45) Date of Patent: Nov. 21, 2023

(54) SECURE DATA PROCESSING (71) Applicant: LEDGER, SAS, Paris (FR)

(72) Inventors: Olivier Tomaz, Orsay (FR); Nicolas Bacca, Courbevoie (FR)

(73) Assignee: Ledger, SAS, Paris (FR)

( * ) Notice: Subject to any disclaimer, the term of this patent is extended or adjusted under 35 U.S.C. 154(b) by 62 days.

(21) Appl. No.: 16/980,327

(22) PCT Filed: Mar. 13, 2019

(86) PCT No.: PCT/FR2019/000033
§ 371 (c)(1),
(2) Date: Sep. 11, 2020

(87) PCT Pub. No.: WO2019/175482
PCT Pub. Date: Sep. 19, 2019

(65) Prior Publication Data
US 2021/0042043 A1 Feb. 11, 2021

(30) Foreign Application Priority Data
Mar. 14, 2018 (FR) ...................................... 1870286

(51) Int. Cl.
*G06F 21/51* (2013.01)
*G06F 21/52* (2013.01)
(Continued)

(52) U.S. Cl.
CPC .......... *G06F 3/0622* (2013.01); *G06F 3/0655* (2013.01); *G06F 3/0679* (2013.01);
(Continued)

(58) Field of Classification Search
CPC ........ G06F 21/62; G06F 3/0655; G06F 21/52; G06F 3/0622; G06F 21/602; G06F 21/44;
(Continued)

(56) References Cited

U.S. PATENT DOCUMENTS

| 8,880,904 B2 * | 11/2014 | Apvrille | G06F 21/64 |
| | | | 713/193 |
| 2004/0187006 A1 * | 9/2004 | Trapp | H04L 63/083 |
| | | | 713/176 |

(Continued)

FOREIGN PATENT DOCUMENTS

| CN | 102270285 A | * 12/2011 | ........... H04L 9/3263 |
| JP | 2008148095 A | * 6/2008 | |
| WO | WO-2019057308 A1 | * 3/2019 | ........... G06F 21/575 |

OTHER PUBLICATIONS

Andreas Nilsson, "Key Management with Trusted Platform Modules", Dec. 31, 2006, KTH Computer Science and Communication (Year: 2006).*

(Continued)

*Primary Examiner* — Joseph P Hirl
*Assistant Examiner* — Aayush Aryal
(74) *Attorney, Agent, or Firm* — Workman Nydegger (57) ABSTRACT

Devices and methods for executing instructions in an automatic and secure manner include a security processor having at least a read-only memory, a random access memory, a computer capable of performing cryptographic functions, a monotonic counter management unit associated with one or more monotonic counters, is such that it does not include any other storage memory, meaning that the security processor does not store any program or external data, a public key allowing at least one initial enrolled administrator to be authenticated is stored before the first use of same in its read-only memory, its random access memory is capable of loading a set of data and instructions that can be authenticated by a public key cryptographic module, the execution by the computer, after the authentication of same, of certain instructions, increments one of the monotonic counters.

14 Claims, 4 Drawing Sheets

(51) Int. Cl.
*G06F 21/57* (2013.01)
*G06F 21/62* (2013.01)
*G06F 21/44* (2013.01)
*G06F 3/06* (2006.01)
*G06F 21/60* (2013.01)
*H04L 9/30* (2006.01)
*H04L 9/32* (2006.01)

(52) U.S. Cl.
CPC .............. *G06F 21/602* (2013.01); *H04L 9/30* (2013.01); *H04L 9/32* (2013.01)

(58) Field of Classification Search
CPC ...... G06F 3/0679; G06F 21/51; G06F 21/577; H04L 9/30; H04L 9/32
See application file for complete search history.

(56) References Cited

U.S. PATENT DOCUMENTS

| | | | | |
|---|---|---|---|---|
| 2006/0090084 | A1* | 4/2006 | Buer | G06F 21/53 713/189 |
| 2011/0162083 | A1 | 6/2011 | Apvrille et al. | |
| 2012/0254602 | A1* | 10/2012 | Bhansali | G06F 21/31 713/2 |
| 2014/0137178 | A1* | 5/2014 | Thom | G06F 21/6218 726/17 |

OTHER PUBLICATIONS

Andreas Nilsson, "Key Management with Trusted Platform Modules", Dec. 31, 2006, Retrieved from: https://moam.info/key-management-with-trusted-platform-modules-kth_5a1d14e31723dd27323b353f.html, XP055530259, 3-6, Figure 2.140-33, https://www.nada.kth.se/utbildning/grukth/exjobb/rapportlistor/2006/rapporter06/nilsson_andreas_06049.pdf, Dec. 5, 2018.

International Search Report and Written Opinion, English translation, from PCT/FR2019/000033 filed Mar. 13, 2019, dated Apr. 29, 2019.

Andreas Nilsson, *Key Management with Trusted Platform Modules*, Royal Institute of Technology, School of Computer Science, 2006, pp. 1-68.

Luis F. G. Sarmenta et al., *Virtual Monotonic Counters and Count-Limited Objects Using a TPM without a Trusted OS*, Computer Science and Artificial Intelligence Laboratory, Nov. 3, 2006, XP058290853, pp. 27-42.

* cited by examiner

SECURE DATA PROCESSING

BACKGROUND OF THE INVENTION

1. The Field of the Invention

The invention relates to secure data processing. More precisely, it relates to a security processor of the type comprising a read only memory, a random access memory, a computer capable of performing cryptographic functions, and a monotonic counter management unit associated with at least one monotonic counter, a secure data processing assembly comprising such a security processor and, with connection means, an external memory, a secure data processing infrastructure comprising several security processors, and lastly, a method for implementing such a secure data processing assembly.

2. The Relevant Technology

In the context of the invention, security refers to the maintenance and control of the integrity of a program comprised of instructions and the context relating thereto, as well as the authentication of persons giving orders to execute said program. The term "context" should be understood as a set of parameters, instructions and conditions and, more broadly, any set of instructions, code or data under which the program can be implemented. The term "administrator" refers to, on the one hand, the initial enrolled administrator and, on the other, any other subsequent enrolled administrator. "Enrolled" can be understood as being registered, enlisted, or, in other words, authorised to give instructions. "Authentication of an enrolled administrator" refers to the process used to verify that a person giving instructions is an enrolled administrator and to authorize the execution of the instructions in question by the security processor. "Authentication of enrolled administrators" refers to a similar process applied individually to several people and to enrolled administrators.

Document FR2906380 describes a system for securing data stored on a physical medium and the method of its implementation. The data security system is embedded in a device such as a mobile phone comprising, in particular, a box provided with a keyboard, a screen, a microphone, a speaker, an electronic card, a module for transmitting and receiving data, a subscriber identification module and a battery to supply power. The electronic card comprises at least a microcontroller, a random access memory, a Flash memory, and a bus system. Operation of the telephone is managed by an operating system and a set of applications loaded in a memory of said telephone, for example. The security system comprises, forming a whole, a calculation entity (such as a microprocessor) with, where appropriate, system resources such as a random access memory, a monotonic counter (which can only be incremented by a single unit), a system key (cryptographic key accessible only to entities authorised by the system), and a physical data medium ensuring the persistent storage of computer data (such as a hard disk, flash memory, etc.). This physical data medium comprises at least one data block and two master blocks, the sizes of which are configurable. The implementation method uses an authentication key. The data security system and the method for the implementation of document FR2906380 aim to resolve a security problem against, on the one hand, replay (fraudulent accessing of data by illicit copying of the previous content of a data management system) and, on the other hand, alterations or modifications induced, in particular, by sudden interruptions to services (such as a power cut or an untimely system restart). This document does not cover the authentication of administrators.

Document U.S. 2004/0187006 relates to the field of data security and, more particularly, the reliable retrieval of data from external memory because which is not secure because it is located outside a secure environment. The data security system comprises a calculation entity and the use of a monotonic counter to determine, in the secure environment, whether a request to the external memory returns the most recent data. The monotonic counter is incremented each time a major element is written to memory. A control entry records the time the item linked to it was modified. The monotonic counter value remains the same until the next time data is written to memory. While this document describes the implementation of a monotonic counter, it is not intended to provide security according to the invention.

Document US2014/0137178 relates to a method comprising the steps of receiving, by a secure platform module TPM of a computing device, a request emanating from a program in the computer device to access information contained in a protected object; determining if the conditions allowing the program to access the information are met; allowing the program to access information in response to the conditions being met; denying the program access to information in response to the conditions not being met; and locking, in response to an unfulfilled condition for a threshold number of requests from the program, the information for an indefinite period in order to prevent the program accessing the information. Objects are maintained by a secure platform module. Each of the objects stores information and is associated with a policy identifying the conditions that a program must meet in order for the program to access the information. For each of the objects, the secure platform module manages a monotonic counter associated with the object. The monotonic counter is used to determine if a threshold number of object information access requests have been made that do not meet the conditions of the strategy associated with the object. The Trusted Platform Module provides secure storage and/or secure processing functionalities to the computing device. Secure storage refers to non-volatile memory that is protected by specific functions or other components of the secure platform module and which can only be accessed by it. The Information is stored in a data structure or an object designated under the name of the object protected by the module and can take various forms, including a cryptographic key. Information can be accessed in different ways, such as reading information, writing it or modifying it, etc. The non-volatile memory includes one or more monotonic counters and one or more protected objects (see FIG. 1 of the document).

The document "Key Management with Trusted Platform Modules" by Andreas Nilsson, published by KTH CSC relates to a concept that aims to make computing platforms more reliable. It is based on a chip called the Trusted Platform Module (TPM). TPM is a chip that provides cryptographic functions such as RSA encryption and secure key storage. Each TPM has a unique pair of keys called the validation key, created internally by the TPM after manufacture but before shipment to customers. The key pair uniquely identifies the TPM and can never be changed. The private part never leaves the TPM and the public part is used in an authentication certificate. Non-volatile memory and volatile memory are provided, the non-volatile memory is used to store persistent identity and status data as well as internal keys. With the owner's permission, it is possible to write and read persistent and opaque data (to which the TPM does not have access or that it cannot use) to and from the TPM. The volatile memory is mainly used internally by the TPM.

The document "Virtual Monotonic Counters and Count-Limited Objects using a TPM without a trusted OS" by Luis F. G. Sarmenta et al describes a further development of virtual monotonic counters with non-trusted machines with a TPM secure platform module.

The problem at the root of the invention is, as regards a security processor comprising a read only memory, a random access memory, a computer capable of performing cryptographic functions, and a monotonic counter management unit associated with at least one monotonic counter, to ensure that it is secure in use, to maintain control of the integrity of the programs which it executes and of the contexts which relate to it, and to authenticate the enrolled administrators giving orders to execute said programs.

The invention provides a solution to this problem, in particular in that the processor does not include any other storage memory such that it does not store any external programs or data. The storage is therefore "externalised" with respect to the processor, the execution system being separated and isolated from the data to be executed, so as to maintain perfect integrity.

SUMMARY OF THE INVENTION

Below is a description of the invention.

According to a first aspect, the subject of the invention is a security processor comprising at least a read-only memory, a random-access memory, a computer capable of performing cryptographic functions and a monotonic counter management unit associated with at least one monotonic counter. This security processor is such that:
- It does not include any other storage memory, so that it does not store programs, contexts/instructions, code, data—or external data,
- a public key allowing at least one initial enrolled administrator to be authenticated is stored before its first use in read only memory,
- the random access memory is able to load a set of data, such as a context, and of instructions which can be authenticated by a public key cryptographic module,
- the execution, by the computer, after authentication by the initial enrolled administrator, of certain instructions increments one of the monotonic counters.

Such a security processor enables, in the context of a secure data processing assembly comprising such a security processor and an external memory, the automatic execution of a sequence of operations in a secure manner.

In one embodiment, the security processor is emulated as a virtual machine.

According to a second aspect, the subject of the invention is a secure data processing assembly comprising a security processor, as has just been described and, in addition, at least one memory external to this security processor and at least one connection means capable of connecting this to at least one memory external to the security processor, such as, in particular, using an electronic communications network.

According to one characteristic and one embodiment, for security reasons, the secure data processing assembly comprises a plurality, i.e., at least two, external memories connected to the security processor.

According to one characteristic, at least one external memory of the secure data processing assembly is authenticated with regards to the security processor.

According to one embodiment, the external memory of the secure data processing assembly is configured to be suitable and specifically intended to:
- store at least one program and at least one context—instructions, code, data—, intended to be loaded into the random access memory of the security processor,
- and to be able to receive and store any authenticated file resulting from execution by the security processor of at least one program and at least one context which has been temporarily loaded into the random access memory of the security processor, while at least one context may include a reference value suitable for enabling the security processor to verify synchronisation of at least one context with the last state of a monotonic counter.

According to a third aspect, the subject of the invention is a secure data processing infrastructure which comprises a plurality of, i.e., at least two, security processors such as those previously described, and at least one external memory such as that previously described in relation to the secure data processing assembly, the infrastructure being such that each security processor of the plurality of security processors is connected to at least one external memory.

According to one embodiment, the secure data processing infrastructure comprises a plurality of, i.e., at least two, external memories, each security processor of the plurality of security processors being connected to at least one external memory of the plurality of external memories.

According to one possible embodiment, the secure data processing infrastructure comprises a plurality, i.e., at least two, external memories synchronised with each other, each of the security processors of the plurality of security processors being able to indistinctly use one or other of the external memories of the plurality of external memories.

According to one possible embodiment, the secure data processing infrastructure comprises several pairs, trios, quartets or more, of external memories, each of the security processors being associated with a pair, a trio, a quartet or more of external memories synchronised between themselves.

Therefore, the security processor itself does not include any other storage memory. One or more such storage memories external to the security processor form a secure data processing assembly or a secure data processing infrastructure.

According to a fourth aspect, the invention relates to a method for the secure execution of a sequence of operations by a secure data processing assembly comprising at least the execution of the following steps:
- A: an administrator with an external memory connected to the security processor activates the security processor,
- B: once activated, the security processor retrieves a public key from an external memory in order to be able to authenticate it using a public key cryptographic module,
- C: if the security processor authenticates the administrator who activated it as being a subsequent enrolled administrator, it loads a set of data and instructions authenticated by the subsequent enrolled administrator and executes it,
- D: execution by the security processor produces a set of data, some of which may be authenticated, and this data set, once generated by the security processor, is stored in the external memory used by the subsequent enrolled administrator.

According to one characteristic and one embodiment, and for security reasons, the method which has just been described is executed with two subsequent enrolled administrators and, more generally, a plurality of at least two subsequent enrolled administrators, each having an external memory.

The method also includes the execution of initial steps in which an initial enrolled administrator has a secure data processing assembly and enrolls a subsequent enrolled administrator.

The method then comprises the execution of the following enrolment steps:
A': a first set of data and instructions, authenticated and verified using the public key stored in the read-only memory, is loaded into the random access memory of the security processor in order to enable it to execute a program to authorize a subsequent enrolled administrator and upload another set of data and instructions and have it executed by the security processor,
B': execution by the security processor of the first set of data and instructions generates an encrypted and signed file comprising the authentication elements of the subsequent enrolled administrator and which is saved and stored in a memory external to the security processor by the subsequent enrolled administrator,
C': execution by the security processor of the first set of data and instructions simultaneously results in the incrementation of a monotonic counter.

According to one characteristic and one embodiment, for security reasons, the enrolment steps which have just been described are such that an initial enrolled administrator enrolls at least two subsequent enrolled administrators and, more generally, a plurality of at least two subsequent enrolled administrators.

According to one embodiment, the three steps A', B' and C' described above can be repeated several times so as to enable different groups of subsequent enrolled administrators to be enrolled and to load and execute different sets of data and instructions, all with a view to being able to have the security processor execute and transmit a sequence of operations to an electronic device or external network.

The method is also characterised in that it comprises the execution of the following subsequent steps:
the subsequent enrolled administrators enrolled during prior enrolment steps authenticate themselves on the security processor with regards to the execution context as it is, using a reliable access control method, such as an electronic signature, before being able to load into the RAM of the security processor a set of data and instructions,
execution by the security processor of the set of data and instructions generates a second encrypted and signed file comprising data related to the execution of the code, and which is saved and stored only by each of these subsequent enrolled administrators outside the security processor, in external memory, which can cause the incrementation of one or more monotonic counters.

For security reasons, it can be expected that the set of data and instructions, once loaded into the security processor's RAM, can only be executed after the security processor has validated the authentication of all administrators subsequent enrolled by the previous set of data and instructions.

BRIEF DESCRIPTION OF THE DRAWINGS

The figures of the drawings are briefly described here.

DETAILED DESCRIPTION OF THE PREFERRED EMBODIMENTS

A security processor PS according to the invention comprises (FIG. 1) a read-only memory ROM, a random access memory RAM, a computer UE capable of performing cryptographic functions, a monotonic counter management unit UG associated with at least one monotonic counter CM.

Figure 1:
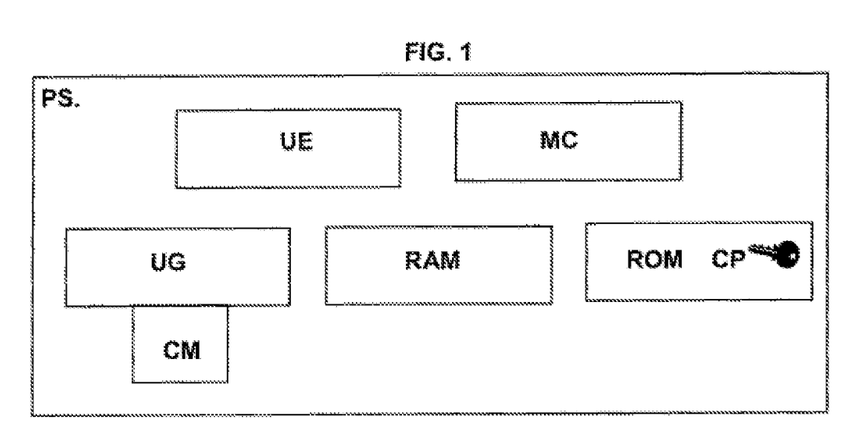
FIG. 1 schematically represents the various components constituting an elementary security processor according to the invention. This figure illustrates that the security processor only includes a read-only memory, a random access memory, a computer, a monotonic counter management unit associated with a monotonic counter, and does not include any other storage memory, such that it does not store external programs or data.

A public key CP, making it possible to authenticate at least one initial enrolled administrator AI, is stored before its first use in the read-only memory ROM. The random access memory RAM is able to load a set of data—such as a context—and instructions, which can be authenticated by a public key cryptographic module MC which the security processor PS includes.

Execution by the computer UE, after their authentication, of certain instructions, can increment a monotonic counter CM.

In one embodiment, the security processor PS is emulated as a virtual machine.

According to one characteristic of the security processor PS, the latter does not include any other permanent storage memory, such that the security processor PS does not permanently store any program, context—instructions, code, data—or external data.

As such, the security processor PS comprises the read-only memory ROM, the random access memory RAM, the computer UE, the management unit UG, at least one monotonic counter CM and the cryptographic module MC.

Figure 2:
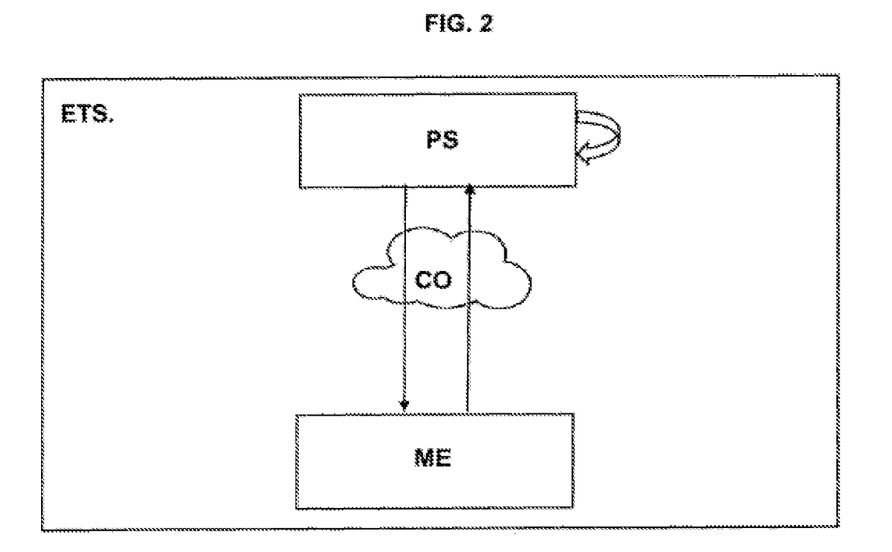
FIG. 2 schematically represents the different components that make up a secure processing assembly for elementary data according to the invention, comprising a security processor such as that in FIG. 1, a memory external to the security processor, and connection means capable of connecting said security processor and the memory external to it, such as via an electronic communication network.
Figure 3:
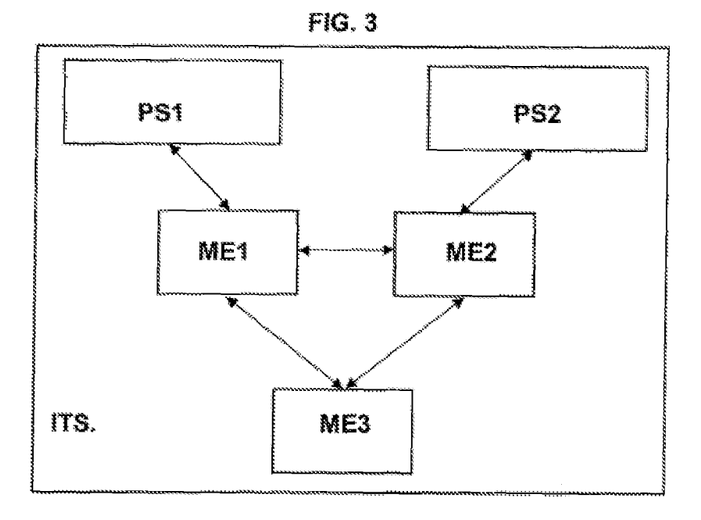
FIGS. 3 and 4 schematically represent the various components constituting two infrastructures for secure data processing according to the invention. In the case of FIG. 3, the infrastructure comprises two security processors such as those in FIGS. 1 and 2, and three external memories such as that in FIG. 2, synchronised with each other, each of the security processors being able to use one of the three external memories indistinctly. In the case of FIG. 4, the infrastructure comprises two security processors such as those in FIGS. 1 and 2 and two pairs of external memories such as that in FIG. 2, each of the security processors being associated with a pair of external memories, synchronised with each other.
Figure 4:
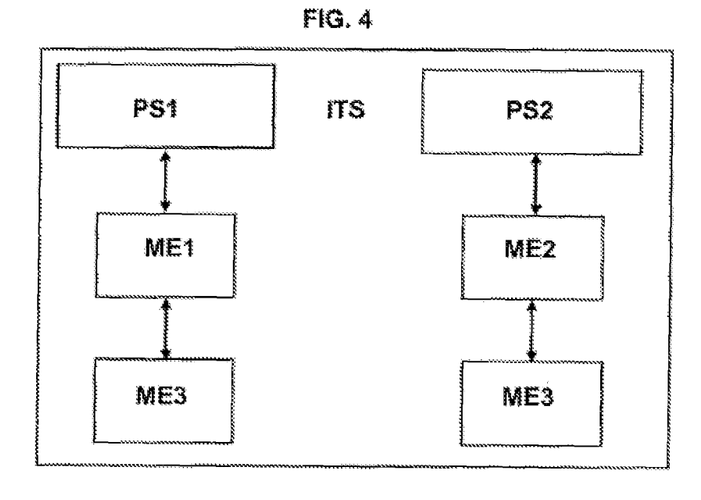

However, at least one such storage memory ME is provided for the secure processing of data, but the latter is external to the security processor PS and not part of it or physically integrated into it. This is how one forms, with such a security processor PS and at least one such storage memory ME, as well as appropriate means of communication, a secure data processing assembly ETS or a secure data processing infrastructure ITS (FIGS. 2, 3 and 4). The security processor PS can, in such a secure data processing assembly ETS or in such a secure data processing infrastructure ITS, automatically execute a sequence of operations in a secure manner. This is understood to mean the maintenance and control of the integrity of the program and the related context, as well as the authentication of enrolled administrators, in the sense defined above.

Storage memory which is "external to the security processor" can be understood as being a memory which is not included in the physical unit which constitutes the processor PS. For this reason, this memory is called "external memory" and referenced ME.

The characteristic that the memory ME is external to the security processor PS has the function of externalizing storage with respect to the processor PS, or, in other words, to separate and isolate the execution system (the processor PS) from the data.

The characteristic that the memory ME is external to the security processor PS results, on the one hand, in the data processing capacity of the processor PS not being limited, and on the other, in guaranteeing the immutability, and therefore the integrity of the processing by the processor, because the external permanent memory has no effect or influence on the security processor PS itself.

The invention also relates to all other means different to an external storage memory ME such as has just been described, but which fulfil the same function and provide a result similar to that which has just been explained.

A secure data processing assembly ETS comprises (FIG. 2) a security processor PS as described above and, in addition, an external memory ME, in the sense defined above. The assembly ETS also comprises at least one connection means CO, capable of connecting the external memory ME to the security processor PS, such as, in particular, via an electronic communication network.

The secure data processing assembly ETS can only include a single external memory ME. However, if it is desired for security reasons that application decisions cannot be executed by a single person, provisions are made for the secure data processing assembly ETS to include at least two external memories ME for at least two subsequent enrolled administrators AU.

The following description is given in relation to an embodiment with two external memories ME. However, the characteristic for the number of external memories ME is not limited. In particular, more than two external memories ME can be used. This is why we can refer to a plurality, i.e., at least two, external memories ME (the number of external memories ME may be greater) and to a plurality, i.e., at least two, subsequent enrolled administrators AU (the number of subsequent enrolled administrators AU may be greater).

The connection means CO can enable, in the direction from the security processor PS to the external memory ME, encrypted storage, and in the direction from the external memory ME towards the security processor PS, encrypted retrieval.

The contents of the external memories ME of the secure data processing assembly ETS is authenticated with regards to the security processor PS.

An external memory ME is configured to be suitable and specifically intended to store at least one program and at least one context—instructions, code, data—, intended to be loaded into the random access memory RAM of the security processor PS, and to be able to receive and store any authenticated set of data resulting from execution, by the security processor PS, of such a program and such a context which has been temporarily loaded into the random access memory RAM, as has just been explained.

A context (a set of parameters and conditions under which the program can be implemented) can include a reference value capable of allowing the security processor PS to check the synchronisation of the context with the last state of a monotonic counter CM.

A secure data processing infrastructure ITS comprises (FIGS. 3 and 4) a plurality, i.e., at least two, security processors PS as has just been described, for example PS1 and PS2, and, in addition, at least one external memory ME, as has just been described.

However, as with the secure data processing assembly ETS, the secure data processing infrastructure ITS may include a plurality, i.e., at least two (or a greater number), of external memories ME. The infrastructure ITS also comprises, as with the assembly ETS, at least one connection means CO, capable of connecting an external memory ME to a security processor PS.

The structure of such a secure data processing infrastructure ITS could be the subject of a number of embodiments, each of said embodiments being such that each of the security processors PS is connected to at least one external memory ME. As such, depending on the case, a security processor PS is connected to a single external memory ME or, conversely, to several external memories ME and, an external memory ME is connected to a single security processor PS or, conversely, to several security processors PS.

As such, a secure data processing infrastructure ITS can be regarded as the structuring of several secure data processing assemblies ETS, combined together and, where appropriate, having in common one or more security processors PS and/or one or more external memories ME.

In one possible embodiment (FIG. 3), the secure data processing infrastructure ITS comprises several security processors PS1, PS2 and several external memories ME1, ME2, ME3, synchronised with one another, such that each of the security processors PS1, PS2 can use one or other of the external memories ME1, ME2, ME3 indistinctly.

Such a structure has the advantage of demonstrating high resistance to faults.

In another possible embodiment (FIG. 4), the secure data processing infrastructure ITS comprises several security processors PS1, PS2 and several pairs, for example ME1a and ME1b, on the one hand, ME2a and ME2b, on the other, or several trios, quartets or more external memories ME, such that each of the security processors PS1, PS2, is associated with a pair, a trio, a quartet . . . of external memories ME, synchronised with each other. Such a structure has the advantage of improving the performance of the system by creating groups of data, by partitioning.

We will now describe methods for implementing a secure data processing assembly ETS as described above, methods which include the execution of successive steps.

In the context of the methods according to the invention, we will need to refer to one or more enrolled administrators AI, AU, who implement these methods. These administrators are the initial enrolled administrator AI and any subsequent enrolled administrator AU. As explained above, if it is desired, for security reasons, that application decisions cannot be executed by a single person, at least two subsequent enrolled administrators AU are required. The description of the methods which follows is given in relation to an embodiment with two subsequent enrolled administrators AU, AU1 and AU2 respectively. However, the characteristic for the number of subsequent enrolled administrators AU is not limited. In particular, more than two subsequent enrolled administrators AU may be used.

Figure 5:
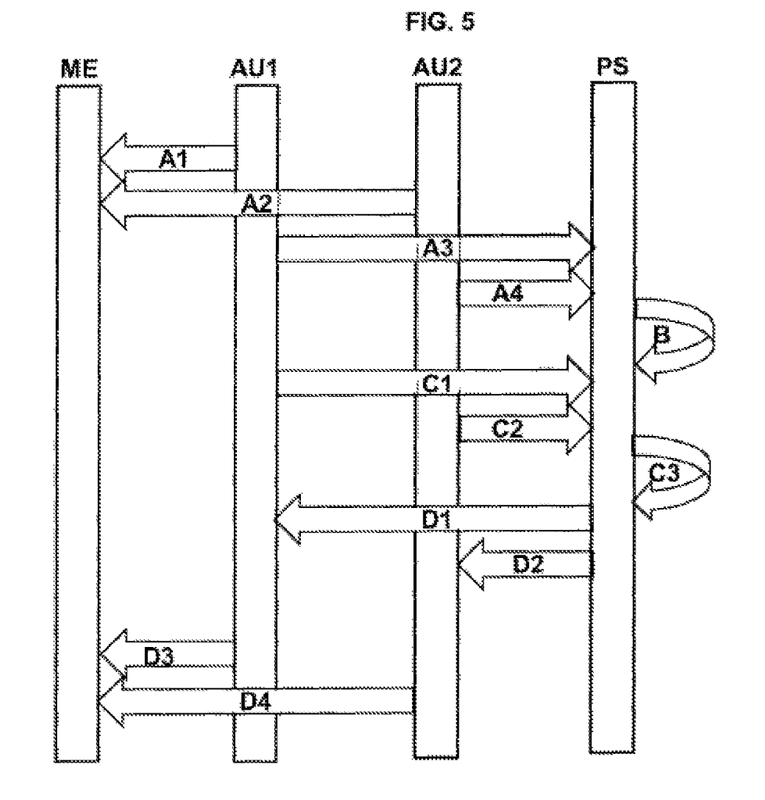
FIG. 5 presents a general view of the execution steps of a secure data processing assembly according to the invention.

We now refer to FIG. 5 to describe, in a general manner, the execution of a secure data processing assembly ETS with two subsequent enrolled administrators AU1 and AU2.

In a step A, the two subsequent enrolled administrators AU1 and AU2, each having an external memory ME connected to the security processor PS, activate said security processor PS. This step A therefore includes the following operations:

A1: retrieval of the context of the enrolled administrator AU1,
A2: retrieval of the context of the enrolled administrator AU2,
A3: activation, by enrolled administrator AU1, of the security processor PS,
A4: activation, by enrolled administrator AU2, of the security processor PS.

In a step B, the security processor PS, once activated, retrieves a public key CP in a memory in order to be able to authenticate them using the cryptographic module MC implementing a public key algorithm.

In a step C, if the security processor PS authenticates the enrolled administrators AU1 and AU2, it loads a set of data and instructions authenticated by said enrolled administrators AU1 and AU2 (operations C1 and C2 for enrolled administrators AU1 and AU2) and executes it (operation C3).

In a step D, said execution (operation C3) by the security processor PS produces a set of data, some of which can be authenticated. This set of data, once produced by the security processor PS, is stored in the external memory(ies) ME used by the enrolled administrator(s) AU1, AU2.

This step 0 therefore comprises the following operations:
01: retrieval of data linked to the enrolled administrator AU1,
02: retrieval of data linked to the administrator enrolled AU2,
03: storage of data assigned to enrolled administrator AU1 in the external memory ME,
04: storage of data linked to enrolled administrator AU2 in the external memory ME.

The method also comprises the following initial enrolment steps, in which an initial enrolled administrator AI has a secure data processing assembly ETS and enrolls at least one subsequent enrolled administrator AU. As described above, if, for security reasons, it is desired that application decisions cannot be executed by a single person, an initial enrolled administrator AI enrolls two or at least two subsequent enrolled administrators AU, respectively AU1 and AU2 for two subsequent enrolled administrators. The enrolment method is described in relation to an implementation with two subsequent enrolled administrators AU1 and AU2. However, as indicated, the characteristic for the number of subsequent enrolled administrators is not limited. Also, and more generally, an initial enrolled administrator AI may enroll a plurality of at least two subsequent enrolled administrators (AU).

The enrolment of these two subsequent enrolled administrators AU, AU1 and AU2 respectively, constitutes a first set participating in the definition of a first authentication context used in subsequent executions.

The initial enrolled administrator can subsequently change one or other of the subsequent enrolled administrators AU who had previously been enrolled. He can add one or more subsequent enrolled administrators AU. He can remove one or more subsequent enrolled administrators AU. He can modify the rights of one or more subsequent enrolled administrators AU. In the event of a subsequent change to one or other of the subsequent enrolled administrators AU who had previously been enrolled, the initial enrolled administrator AI implements the corresponding adaptation method. We then retrieve the updated context and the incremented monotonic counter(s).

Figure 6:
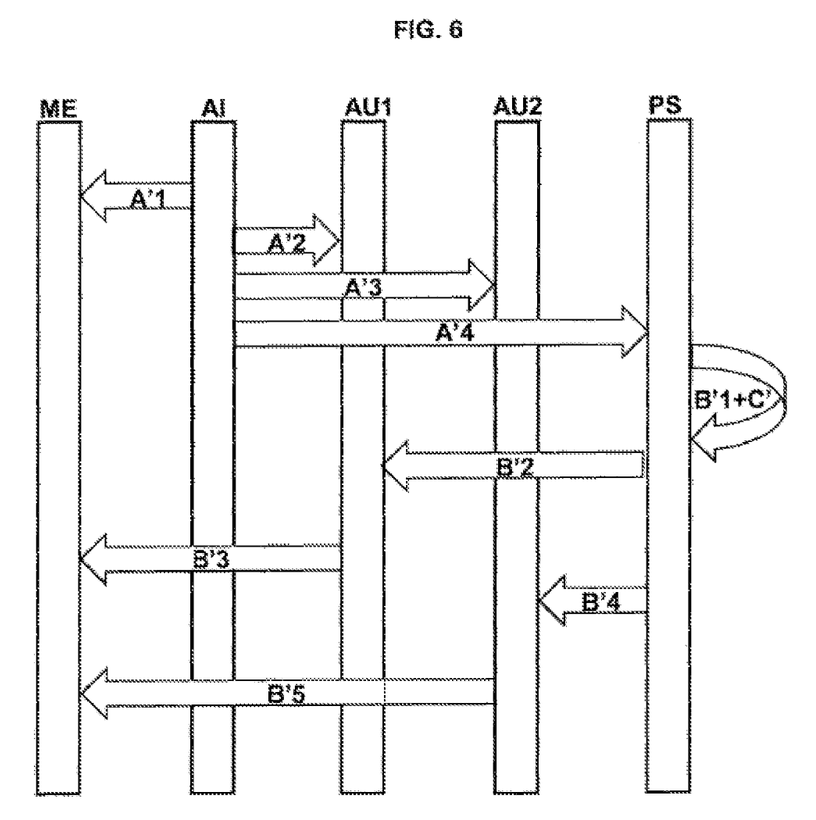
FIG. 6 shows the various enrolment steps for two subsequent enrolled administrators.

Reference is now made to FIG. 6 showing the various enrolment steps for two subsequent enrolled administrators AU1 and AU2. These enrolment steps are, as regards the first two enrolled administrators, designated AU1 and AU2, these are initial steps which precede the execution steps described and represented in FIG. 5. In the event of subsequent changes to one or other of the first enrolled administrators AU1 and AU2, or in the event of changes to one or other of the subsequent enrolled administrators AU enrolled beforehand, the enrolment steps take place when the administrator changes, while the secure data processing assembly ETS has been able to execute instructions previously, with other administrators, in a previous context.

In a step A', a first set of data and instructions, authenticated and verified using the public key CP stored in the read-only memory ROM, is loaded into the random access memory RAM of the security processor PS to enable it to execute an authorisation program for the two subsequent enrolled administrators AU1 and AU2, to load other sets of data and instructions and to have them executed by the security processor PS. This step A' therefore comprises the following operations:

A'1: retrieval of the authorisation program by the initial administrator AI, from the external memory ME,
A'2: retrieval of the authentication elements of the subsequent administrator AU1,
A'3: analogously, retrieval of the authentication elements of the subsequent administrator AU2,
A'4: transmission of the authorisation program and the authentication elements to the security processor PS.

In a step B', the execution by the security processor PS of the first set of data and instructions generates an encrypted and signed file comprising the authentication elements of the subsequent enrolled administrators AU1 and AU2, which is saved and stored in a memory ME external to the security processor PS by each of said subsequent enrolled administrators AU1, AU2. This step B' therefore comprises the following operations:

B'1: execution, by the security safety processor PS, of the first set of data and instructions, at the same time as step C which will be discussed later,
B'2: transmission of encrypted and signed data linked to the subsequent administrator AU1,
B'3: storage, by the subsequent administrator AU1, of these data in the external memory ME,
B'4: analogously, transmission of the encrypted and signed data linked to the subsequent administrator AU2,
B'5: and, analogously, storage by the subsequent administrator AU2 of these data in the external memory ME.

In a step C', execution, by the security processor PS, of the first set of data and instructions (operation B'1) leads, at the same time, to the incrementation of a monotonic counter CM.

The three steps A', B' and C', described above can be repeated several times so as to allow different groups of subsequent enrolled administrators AU, to load and run different sets of data and instructions, all in order to be able to have the security processor PS execute and transmit, to any electronic device or external network, a sequence of operations.

Once the two subsequent administrators AU1 and AU2 have been enrolled, they can execute the following subsequent steps, as previously described with reference to FIG. 5.

The subsequent enrolled administrators AU1 and AU2, enrolled during the previous enrolment steps, authenticate themselves with the security processor PS with regard to the execution context as it is, using a reliable access control method such as an electronic signature, before a set of data and instructions can be loaded into the random access memory RAM of the security processor PS.

This set of data and instructions, once loaded into the random access memory RAM of the security processor PS, can only be executed after the security processor PS has validated the authentication of the two subsequent enrolled administrators AU1 and AU2 using the previous set of data and instructions. This step is not mandatory, it is only optional. This is intended to double the level of security. If you want to double the level of security, perform this step.

The execution, by the security processor PS, of the set of data and instructions, generates a second encrypted and signed file comprising data related to the execution of the code and which is saved and stored only by each of these subsequent enrolled administrators AU1 and AU2, external to the security processor PS, in the external memory ME, which can cause the incrementation of one or more monotonic counters CM.

What is claimed is:

1. A method for executing in a secure manner at least one program with at least one context, the at least one context comprising a set of instructions, code or data under which the at least one program can be executed, the method comprising:
    providing a security processor comprising, within a same physical unit, at least a read only memory, a random access memory, a cryptographic computer capable of performing cryptographic functions, at least one monotonic counter, a monotonic counter management unit associated with the monotonic counter, and a public key algorithm cryptographic module,
    storing in the read only memory of the security processor, before its first use, a public key provided to authenticate at least one initial enrolled administrator,
    providing at least one memory external to the security processor and at least one connection means capable of connecting the security processor to the at least one memory external to the security processor,
    storing in the at least one memory external to the security processor the at least one program with at least one context intended to be executed by the security processor,
    connecting the security processor to the at least one memory external to the security processor,
    temporarily loading in the random access memory of the security processor the at least one program with at least one context,
    authenticating the at least one program with at least one context and authenticating the initial enrolled administrator by the public key algorithm cryptographic module,
    verifying, by the security processor, based on a reference value comprised in the at least one context, a synchronization of the at least one context with a last state of the monotonic counter,
    incrementing the monotonic counter after execution, by the cryptographic computer of the security processor, of certain instructions present in the at least one program temporarily loaded into the random access memory, and
    storing in the memory external to the security processor an authenticated file resulting from the execution, by the cryptographic computer of the security processor, of the certain instructions present in the at least one program temporarily loaded into the random access memory of the security processor.

2. The method of claim 1, wherein the security processor is emulated as a virtual machine.

3. The method of claim 1, further comprising providing a plurality of external memories connected to the security processor.

4. The method of claim 1, further comprising authenticating the at least one memory external to the security processor with regards to the security processor.

5. The method of claim 1, further comprising providing a plurality of security processors and connecting each security processor of the plurality of security processors to at least one external memory.

6. The method of claim 1, further comprising providing a plurality of security processors and a plurality of external memories, and connecting each security processor of the plurality of security processors to at least one external memory of the plurality of external memories.

7. The method of claim 6, further comprising synchronizing a plurality of external memories with each other, and configuring each of the security processors of the plurality of security processors to use either one or the other of the external memories of the plurality of external memories indistinctly.

8. The method of claim 6, further comprising providing several pairs, trios, quartets or more of external memories, and associating each of the security processors with a pair, a trio, a quartet or more of external memories synchronised with each other.

9. The method of claim 1, further comprising the following steps:
    an administrator with an external memory connected to the security processor activates the security processor,
    the security processor, once activated, retrieves a public key in an external memory and authenticates the administrator using the public key algorithm cryptographic module,
    if the security processor authenticates the administrator who activated it as a subsequent enrolled administrator, the security processor loads a set of data and instructions authenticated by said subsequent enrolled administrator and executes it,
    the security processor produces a set of data, some of which may be authenticated, and said set of data is stored in the external memory used by the subsequent enrolled administrator.

10. The method of claim 9, implemented with at least two subsequent enrolled administrators, each having an external memory.

11. The method of claim 9, wherein:
    a first set of data and instructions authenticated and verified using the public key stored in the read-only memory is loaded into the random access memory of the security processor,
    based on said first set of data and instructions, the security processor runs a subsequent enlisted administrator accreditation program, then loads another set of data and instructions and executes it, the security processor then generates an encrypted and signed file comprising the authentication elements of the subsequent enrolled administrator, and the signed file is saved and stored in a memory external to the security processor by the subsequent enrolled administrator, and wherein the execution, by the security processor, of the first set of data and instructions results, at the same time, in the incrementation of the monotonic counter.

12. The method of claim 11, further comprising enrolling different groups of subsequently enrolled administrators, loading and executing different sets of data and instructions, in order to execute, by the security processor, and transmit to any electronic device or external network, a sequence of operations.

13. The method of claim 9, wherein:

the subsequently enrolled administrators, enrolled during previous enrolment steps, authenticate themselves with the security processor with regards to the execution context as it is, by a reliable access control process, such as an electronic signature, before being able to load a set of data and instructions into the random access memory of the security processor, execution, by the security processor, of the set of data and instructions generates a new encrypted and signed file comprising data related to the execution of the code, which is saved and stored only by each of these subsequently enrolled administrators outside the security processor, in the external memory, which lead to the incrementation of one or more monotonic counters.

14. The method of claim 13, wherein the set of data and instructions, once loaded into the random access memory of the security processor, can only be executed after the security processor validates the authentication of all subsequent enrolled administrators by the previous set of data and instructions.

* * * * *